United States Patent
Hochstetler et al.

(10) Patent No.: US 10,634,063 B2
(45) Date of Patent: Apr. 28, 2020

(54) INPUT SHAFT FOR USE IN INTEGRATED DRIVE GENERATOR

(71) Applicant: HAMILTON SUNDSTRAND CORPORATION, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 304 days.

(21) Appl. No.: 15/862,294

(22) Filed: Jan. 4, 2018

(65) Prior Publication Data
US 2019/0203647 A1 Jul. 4, 2019

(51) Int. Cl.
| | |
|---|---|
| H02K 7/10 | (2006.01) |
| F02C 7/32 | (2006.01) |
| F16C 3/02 | (2006.01) |
| F16D 11/14 | (2006.01) |
| F16H 55/17 | (2006.01) |
| F16D 11/00 | (2006.01) |
| F16H 47/04 | (2006.01) |

(52) U.S. Cl.
CPC ............ *F02C 7/32* (2013.01); *F16C 3/02* (2013.01); *F16D 11/14* (2013.01); *F05D 2240/60* (2013.01); *F05D 2260/4031* (2013.01); *F16C 2380/26* (2013.01); *F16D 11/00* (2013.01); *F16D 2011/008* (2013.01); *F16H 47/04* (2013.01); *F16H 2055/173* (2013.01); *H02K 7/10* (2013.01)

(58) Field of Classification Search
CPC .......... H02K 7/108; H02K 7/10; H02K 7/003; H02K 7/116; F16D 11/14; F16D 11/00; F16D 2011/008; F05D 2260/4031; F16C 2380/26; F16H 47/04; F16H 2055/173
USPC ............................... 310/75 D, 76–78, 80–83
See application file for complete search history.

(56) References Cited

U.S. PATENT DOCUMENTS

| | | | | |
|---|---|---|---|---|
| 2,769,437 A | * | 11/1956 | Taylor ..................... | F02N 15/04 |
| | | | | 123/179.1 |
| RE30,525 E | * | 2/1981 | DeLalio .................. | F16H 47/04 |
| | | | | 475/79 |
| 6,095,303 A | * | 8/2000 | Gutmann ................ | F16D 11/10 |
| | | | | 192/108 |

(Continued)

FOREIGN PATENT DOCUMENTS

EP 2098741 A2 9/2009

OTHER PUBLICATIONS

European Search Report for EP Application No. 18248193.7 dated Mar. 26, 2019.

*Primary Examiner* — Thanh Lam
(74) *Attorney, Agent, or Firm* — Carlson, Gaskey & Olds, P.C.

(57) ABSTRACT

An input drive shaft for use in an integrated drive generator has a body extending from an end to a clutch face. The clutch face includes a plurality of clutch teeth extending away from a nominal surface of the body. The clutch face defines an inner bore of a first diameter. The clutch face has an outer peripheral surface defining a second diameter and a ratio of the first diameter to the second diameter is between 1.50 and 1.65. An integrated drive generator and a method are also disclosed.

20 Claims, 2 Drawing Sheets

(56) References Cited

U.S. PATENT DOCUMENTS

| | | | | |
|---|---|---|---|---|
| 6,222,293 | B1 * | 4/2001 | Ikeda | F02N 15/046 |
| | | | | 290/38 A |
| 6,239,503 | B1 * | 5/2001 | Ikeda | F02N 15/046 |
| | | | | 290/38 R |
| 7,900,763 | B2 * | 3/2011 | Paumier | B60K 6/26 |
| | | | | 180/65.21 |
| 8,049,386 | B2 * | 11/2011 | Vanderzyden | F01D 11/003 |
| | | | | 310/88 |
| 8,987,956 | B2 * | 3/2015 | Grosskopf | F16D 11/14 |
| | | | | 192/108 |
| 2010/0156113 | A1 | 6/2010 | Lemmers, Jr. | |
| 2016/0305491 | A1 | 10/2016 | Grosskopf et al. | |

\* cited by examiner

INPUT SHAFT FOR USE IN INTEGRATED DRIVE GENERATOR

BACKGROUND

This application relates to an input shaft for use in an integrated drive generator.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, various accessory systems, such as various pumps, are driven by the carrier of the differential through an accessory drive gear.

The generator input drive shaft raises design challenges.

SUMMARY

An input drive shaft for use in an integrated drive generator has a body extending from an end to a clutch face. The clutch face includes a plurality of teeth extending away from a nominal surface of the body. The clutch face defines an inner bore of a first diameter. The clutch face has an outer peripheral surface defining a second diameter and a ratio of the first diameter to the second diameter is between 1.50 and 1.65.

In addition, as is a method of replacing an input drive shaft in an integrated drive generator. An integrated drive generator and a method are also disclosed.

These and other features may be best understood from the following drawings and specification.

DETAILED DESCRIPTION

Figure 1:
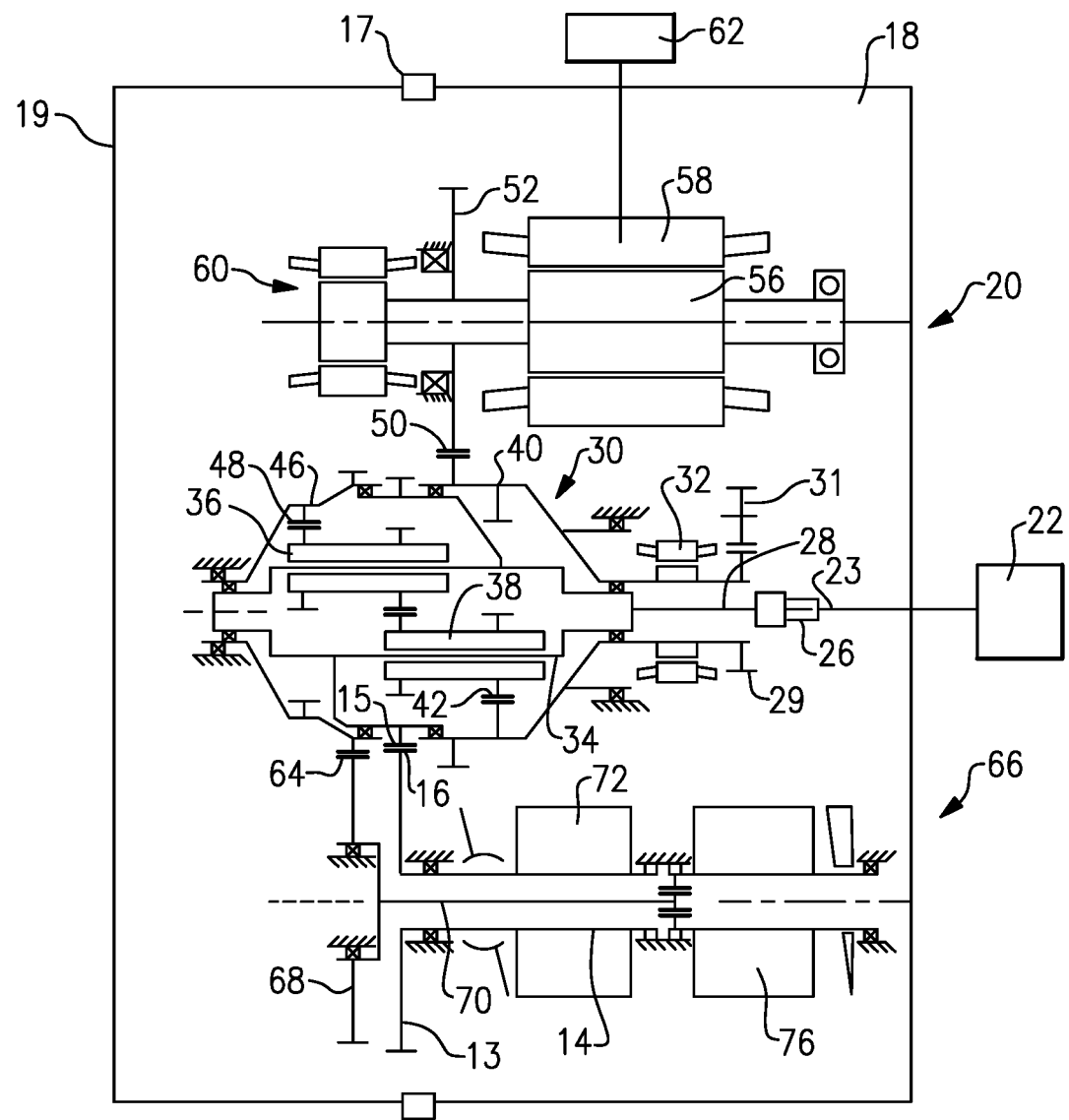
FIG. 1 schematically shows an integrated drive generator.

FIG. 1 shows an integrated drive generator 20. As shown, housing portions 18 and 19 surround the integrated drive generator and a seal plate 17 sits between the housing portions 18 and 19.

A gas turbine engine 22 may drive an input shaft 23 which selectively drives a disconnect assembly 26. The disconnect assembly 26, in turn, drives a carrier shaft 28, which drives a carrier in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

Ring gear portion 40 has a gear interface 50 with a main generator 51 having a drive gear 52. When drive gear 52 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 52 to be relatively constant and at the desired speed. As such, the speed of the input shaft 23 is added to the speed of the speed trimmer 66 to result in a constant input speed to gear 52.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 52 will also be too high, and hence, the speed trimmer 66 acts to lower the speed of the trim gear 46 which will drop the speed of gear 52. On the other hand, if the input speed is too low, the speed trimmer will increase the trim gear speed and he speed seen by gear 52 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 46 to change the speed reaching the generator. In this manner, the speed trimmer 66 results in the frequency generated by the generator being closer to constant, and at the desired frequency.

A permanent magnet generator 32 rotates with the ring gear 40.

An accessory drive shaft 29 rotates with the carrier shaft 28 and drives a plurality of accessory gears 31.

The operation of the integrated drive generator 20 is generally as known in the art. The input drive shaft 23, as described below, is unique. A worker of ordinary skill would recognize that the desired frequency and speed at use 62 would dictate a number of design functions.

Figure 2A:
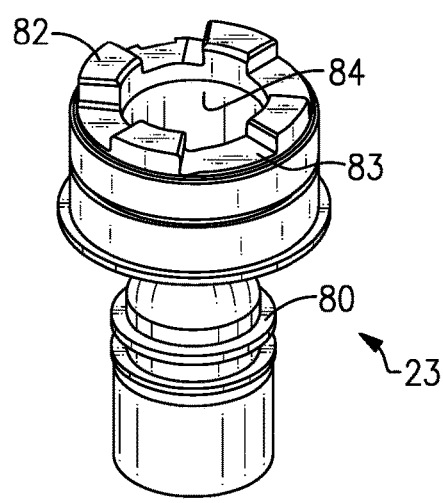
FIG. 2A shows an input drive shaft.

FIG. 2A shows an input drive shaft 23 having a body 80, with clutch teeth 82 circumferentially spaced about an inner bore 84. As shown, there are four clutch teeth 82 extending from a nominal face 83 of body 80.

Figure 2B:
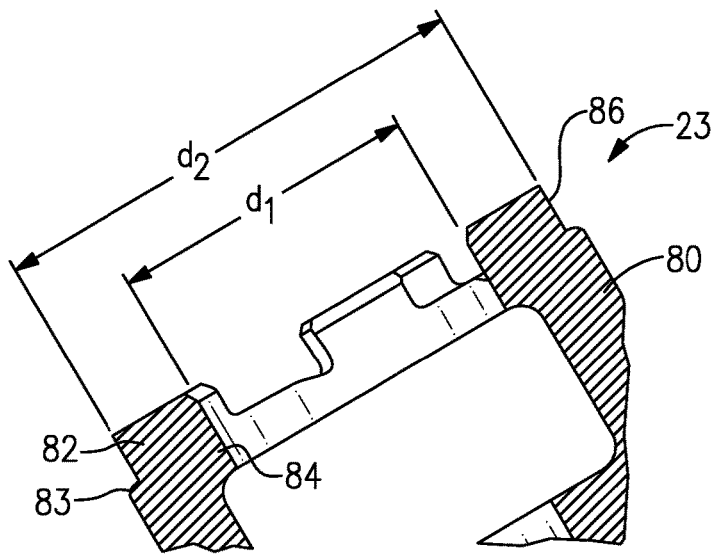
FIG. 2B shows details of the clutch face.

FIG. 2B shows details of a clutch face on the body 80. As shown, the inner bore 84 defines a first diameter $d_1$. The gear teeth 82 extend forwardly of a nominal face 83 and have a radially outer peripheral surface 86. A diameter $d_2$ to the outer surface 86 is also illustrated.

In one embodiment, $d_1$ was 1.170 inches (2.97 centimeters) and $d_2$ was 1.845 inches (4.699 centimeters). These and all dimensions in this application carry a manufacturing tolerance of =/−0.010 inch (0.025 centimeters).

Figure 2C:
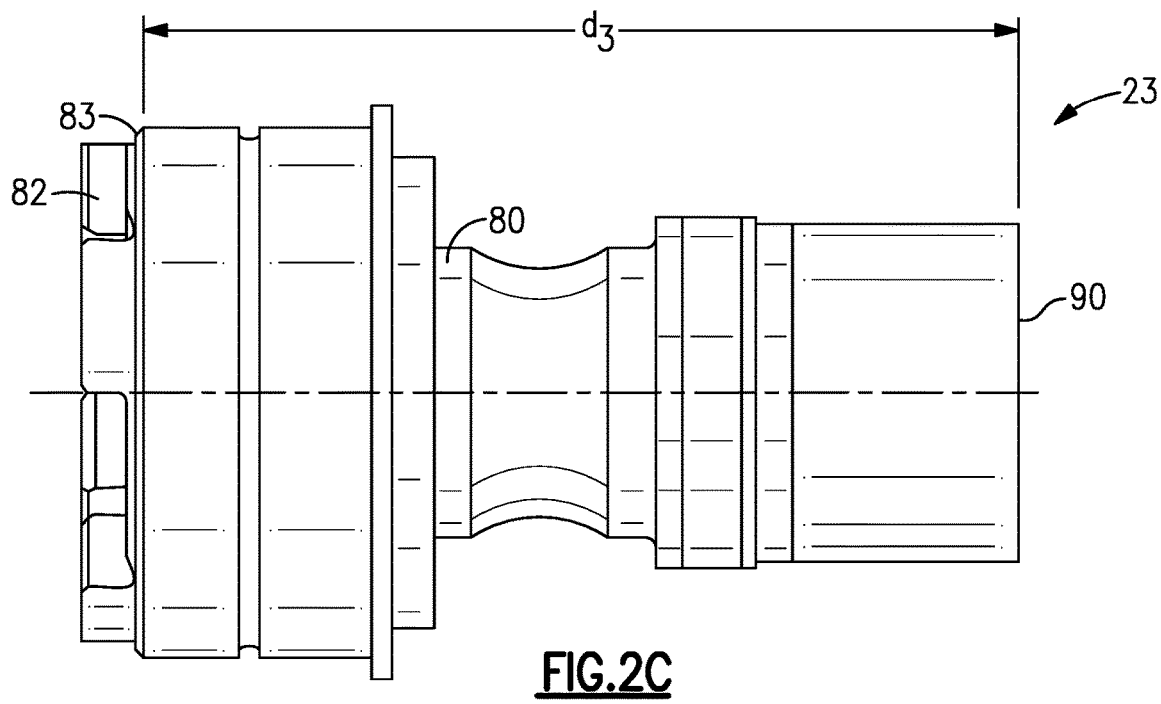
FIG. 2C shows details of the input drive shaft.

FIG. 2C discloses a distance $d_3$ between nominal face 83 and an opposed end 90 of the body 80. In one embodiment, $d_3$ was 3.330 inches (8.46 centimeters).

In embodiments, a ratio of $d_1$ to $d_2$ was between 1.50 and 1.65. A ratio of $d_1$ to $d_3$ was between 0.30 and 0.40. A ratio of $d_2$ to $d_3$ was between 0.50 and 0.60.

A method of replacing an input drive shaft for an integrated drive generator comprises the steps of: a) removing an existing input drive shaft from an integrated drive generator having the existing input shaft, a gear differential including a carrier shaft to be connected to the input drive shaft, and a ring gear connected to a generator; b) replacing the existing input drive shaft with a replacement input drive shaft; and c) the replacement input drive shaft has a body extending from an end to a clutch face, and the clutch face including a plurality of gear teeth extending away from a nominal face of the body, the clutch face defining an inner bore of a first diameter, and the clutch face having an outer peripheral surface defining a second diameter and a ratio of the first diameter to the second diameter being between 1.50 and 1.65.

Although an embodiment of this invention has been disclosed, a worker of ordinary skill in this art would recognize that certain modifications would come within the scope of this disclosure. For that reason, the following claims should be studied to determine the true scope and content of this disclosure.

What is claimed is:

1. An input drive shaft for use in an integrated drive generator comprising:
    a body extending from an end to a clutch face, and said clutch face including a plurality of clutch teeth extending away from a nominal surface of said body, said clutch face defining an inner bore of a first diameter, and said clutch face having an outer peripheral surface defining a second diameter and a ratio of said first diameter to said second diameter being between 1.50 and 1.65.

2. The input drive shaft as set forth in claim 1, wherein there are four of said clutch teeth on said clutch face.

3. The input drive shaft as set forth in claim 2, wherein said nominal surface is spaced from said end by a distance, and a ratio of said first diameter to said distance being between 0.30 and 0.40.

4. The input drive shaft as set forth in claim 3, wherein a ratio of said second diameter to said distance being between 0.40 and 0.50.

5. The input drive shaft as set forth in claim 1, wherein said nominal surface is spaced from said end by a distance, and a ratio of said first diameter to said distance being between 0.30 and 0.40.

6. The input drive shaft as set forth in claim 5, wherein a ratio of said second diameter to said distance being between 0.40 and 0.50.

7. The input drive shaft as set forth in claim 1, wherein said nominal surface is spaced from said end by a distance, and a ratio of said second diameter to said distance being between 0.40 and 0.50.

8. An integrated drive generator comprising:
    an input drive shaft, a gear differential including a carrier shaft to be driven by said input drive shaft, and including a ring gear for driving a generator; and
    said input drive shaft, a body extending from an end to a clutch face, and said clutch face including a plurality of clutch teeth extending away from a nominal surface of said body, said clutch face defining an inner bore of a first diameter, and said clutch face having an outer peripheral surface defining a second diameter and a ratio of said first diameter to said second diameter being between 1.50 and 1.65.

9. The integrated drive generator as set forth in claim 8, wherein there are four of said clutch teeth on said clutch face.

10. The integrated drive generator as set forth in claim 9, wherein said nominal surface is spaced from said end by a distance, and a ratio of said first diameter to said distance being between 0.30 and 0.40.

11. The integrated drive generator as set forth in claim 10, wherein a ratio of said second diameter to said distance being between 0.40 and 0.50.

12. The integrated drive generator as set forth in claim 8, wherein said nominal surface is spaced from said end by a distance, and a ratio of said first diameter to said distance being between 0.30 and 0.40.

13. The integrated drive generator as set forth in claim 12, wherein a ratio of said second diameter to said distance being between 0.40 and 0.50.

14. The integrated drive generator as set forth in claim 8, wherein said nominal surface is spaced from said end by a distance, and a ratio of said second diameter to said distance being between 0.40 and 0.50.

15. A method of replacing an input drive shaft for an integrated drive generator comprising the steps of:
    a) removing an existing input drive shaft from an integrated drive generator having said existing input shaft, a gear differential including a carrier shaft to be connected to said input drive shaft, and a ring gear connected to a generator;
    b) replacing said existing input drive shaft with a replacement input drive shaft; and
    c) the replacement input drive shaft has a body extending from an end to a clutch face, and said clutch face including a plurality of gear teeth extending away from a nominal surface of said body, said clutch face defining an inner bore of a first diameter, and said clutch face having an outer peripheral surface defining a second diameter and a ratio of said first diameter to said second diameter being between 1.50 and 1.65.

16. The method of replacing an input drive shaft t as set forth in claim 15, wherein there are four of said clutch teeth on said clutch face.

17. The method of replacing an input drive shaft as set forth in claim 16, wherein said nominal surface is spaced from said end by a distance, and a ratio of said first diameter to said distance being between 0.30 and 0.40.

18. The method of replacing an input drive shaft as set forth in claim 17, wherein a ratio of said second diameter to said distance being between 0.40 and 0.50.

19. The method of replacing an input drive shaft as set forth in claim 15, wherein said nominal surface is spaced from said end by a distance, and a ratio of said first diameter to said distance being between 0.30 and 0.40.

20. The method of replacing an input drive shaft as set forth in claim 19, wherein a ratio of said second diameter to said distance being between 0.40 and 0.50.

* * * * *